(12) United States Patent
Marlow et al.

(10) Patent No.: US 9,141,707 B2
(45) Date of Patent: Sep. 22, 2015

(54) CONTEXT-BASED OBJECT RETRIEVAL IN A SOCIAL NETWORKING SYSTEM

(75) Inventors: Cameron Alexander Marlow, Menlo Park, CA (US); Robert William Cathcart, San Francisco, CA (US); Jeffrey Scott Dunn, Seattle, WA (US); Rafael Linden Sagula, Kirkland, WA (US); Venkataramanan Iyer Nandagopal, Mountain View, CA (US); Siddharth Kar, Palo Alto, CA (US); Eric Sun, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/553,760

(22) Filed: Jul. 19, 2012

(65) Prior Publication Data

US 2014/0025671 A1    Jan. 23, 2014

(51) Int. Cl.
*G06F 7/00* (2006.01)
*G06F 17/30* (2006.01)

(52) U.S. Cl.
CPC .................. *G06F 17/30867* (2013.01)

(58) Field of Classification Search
CPC . G06F 3/04883; G06F 3/04842; G06F 3/048; G06F 3/0481; G06F 3/0486; G06F 17/30061; G06F 17/3097; G06F 2209/545; G06Q 50/10; Y10S 715/968
See application file for complete search history.

(56) References Cited

U.S. PATENT DOCUMENTS

| | | | |
|---|---|---|---|
| 5,907,837 A * | 5/1999 | Ferrel et al. ............................ 1/1 |
| 5,940,834 A | 8/1999 | Pinard et al. |
| 6,185,587 B1 | 2/2001 | Bernardo et al. |
| 7,904,446 B1 * | 3/2011 | Srivastava ..................... 707/716 |
| 8,051,107 B2 | 11/2011 | Lam |
| 8,180,804 B1 | 5/2012 | Narayanan et al. |
| 8,260,764 B1 * | 9/2012 | Gruber ......................... 707/708 |
| 2001/0047355 A1 * | 11/2001 | Anwar .............................. 707/5 |
| 2002/0073125 A1 | 6/2002 | Bier |
| 2003/0023641 A1 | 1/2003 | Gorman et al. |
| 2003/0225853 A1 | 12/2003 | Wang et al. |
| 2004/0015480 A1 * | 1/2004 | Federighi et al. ................. 707/1 |

(Continued)

FOREIGN PATENT DOCUMENTS

| | | |
|---|---|---|
| EP | 1019848 A1 | 7/2000 |
| KR | 10-2008-0077382 A | 8/2008 |

(Continued)

OTHER PUBLICATIONS

PCT International Search Report and Written Opinion, PCT Application No. PCT/US2013/050926, Oct. 25, 2013, thirteen pages.

(Continued)

*Primary Examiner* — Augustine K Obisesan
(74) *Attorney, Agent, or Firm* — Fenwick & West LLP

(57) ABSTRACT

Embodiments improve the ability of users of a social networking system to search for information that is likely to be relevant to them by learning and/or applying a search context associated with selector components used to search for objects of the social networking system. The search context is specific to the use of an individual selector and thus need not be as general as the context of an entire page or set of pages in which selectors can be embedded. The social networking system may learn the context of a selector by monitoring user selections from prior search results performed using the selector.

18 Claims, 6 Drawing Sheets

(56) References Cited

U.S. PATENT DOCUMENTS

| | | |
|---|---|---|
| 2004/0135806 A1 | 7/2004 | Pickering et al. |
| 2004/0167813 A1 | 8/2004 | Robertson et al. |
| 2005/0039112 A1 | 2/2005 | Kim |
| 2005/0091252 A1* | 4/2005 | Liebich et al. ............... 707/102 |
| 2005/0172261 A1 | 8/2005 | Yuknewicz et al. |
| 2005/0229113 A1* | 10/2005 | Martineau et al. ............ 715/822 |
| 2005/0273773 A1* | 12/2005 | Gold et al. .................... 717/139 |
| 2006/0020884 A1 | 1/2006 | Graham |
| 2006/0031404 A1 | 2/2006 | Kassab |
| 2006/0235984 A1 | 10/2006 | Kraus et al. |
| 2006/0248442 A1 | 11/2006 | Rosenstein et al. |
| 2007/0136683 A1* | 6/2007 | Heidari et al. ................ 715/792 |
| 2007/0220423 A1 | 9/2007 | Charbonneau et al. |
| 2007/0282896 A1* | 12/2007 | Wydroug et al. ......... 707/103 R |
| 2008/0127052 A1* | 5/2008 | Rostoker ...................... 717/105 |
| 2008/0228887 A1 | 9/2008 | Robertson et al. |
| 2009/0013279 A1 | 1/2009 | Klems et al. |
| 2009/0024590 A1* | 1/2009 | Sturge et al. ...................... 707/3 |
| 2009/0132504 A1* | 5/2009 | Vegnaduzzo et al. ............. 707/4 |
| 2009/0157693 A1 | 6/2009 | Palahnuk |
| 2009/0177655 A1 | 7/2009 | Goel et al. |
| 2010/0145976 A1* | 6/2010 | Higgins et al. ................ 707/765 |
| 2010/0251156 A1* | 9/2010 | Cantwell ....................... 715/771 |
| 2011/0093488 A1* | 4/2011 | Amacker et al. .............. 707/767 |
| 2011/0137902 A1 | 6/2011 | Wable et al. |
| 2011/0307469 A1* | 12/2011 | Ghosh et al. .................. 707/711 |
| 2012/0117058 A1* | 5/2012 | Rubinstein et al. ........... 707/723 |
| 2012/0166432 A1 | 6/2012 | Tseng |
| 2012/0233151 A1* | 9/2012 | Vanderwende et al. ....... 707/722 |
| 2013/0166563 A1* | 6/2013 | Mueller et al. ................ 707/740 |
| 2013/0218919 A1 | 8/2013 | Solonchev |

FOREIGN PATENT DOCUMENTS

| | | | |
|---|---|---|---|
| KR | 10-2012-0073222 A | | 7/2012 |
| WO | WO 0131479 A1 * | | 5/2001 |
| WO | WO 01/40975 A2 | | 6/2001 |
| WO | WO 01/77883 A1 | | 10/2001 |
| WO | WO 02/103552 A1 | | 12/2002 |
| WO | WO 03/003642 A2 | | 1/2003 |
| WO | WO 03/107238 A1 | | 12/2003 |
| WO | WO 2006096838 A1 * | | 9/2006 |
| WO | WO 2009023984 A1 * | | 2/2009 |
| WO | WO 2009064319 A1 * | | 5/2009 |
| WO | WO 2010085523 A1 * | | 7/2010 |

OTHER PUBLICATIONS

European Patent Office, European Search Report and Opinion, European Patent Application No. 13176788.1, Nov. 20, 2013, six pages.

* cited by examiner

FIG. 6

CONTEXT-BASED OBJECT RETRIEVAL IN A SOCIAL NETWORKING SYSTEM

BACKGROUND

The present invention generally relates to the field of computer data storage and retrieval, and more specifically, to performing searches for objects within a social networking system.

Modern computing systems store vast amounts of data, and as a consequence it has become increasingly important to provide users with effective ways to locate information that is relevant to their interests. One area in which a large amount of information is involved is social networking. Social networking systems allow users to designate other users as friends (or otherwise connect to or form relationships with other users), contribute and interact with media items, use applications, join groups, list and confirm attendance at events, create pages, and perform other tasks that facilitate social interaction. Since each of these tasks may involve various data objects, social networking systems are good examples of the demand for systems that help users locate relevant information from within a large set of information tracked or otherwise used by the system.

Searches for information on a social networking system sometimes take place within a particular context. For example, users might specify some searches from within a data search area located on a page about restaurants. Although it might be helpful to customize a search to result in, or emphasize, objects particularly relevant to the context (e.g., restaurants), the search functionality currently available on social networking systems typically does not include a way to determine what the search context is, nor to take that search context into account when performing a search. This makes locating information of particular relevance to a given search more challenging.

SUMMARY

Embodiments of the invention improve the ability of users of a social networking system to search for information that is likely to be relevant to them by learning and/or applying a search context associated with selector components used to search for objects of the social networking system. The search context is specific to the use of an individual selector and thus need not be as general as the context of an entire page or set of pages in which selectors can be embedded. Thus, for example, one search on a particular restaurant-related page may be specified using a first selector embedded within a data search area associated with the menu of the restaurant (e.g., titled "Search our menu"), and a different search on the same page may be specified using a second selector within the data search area associated with particular events that will be taking place at that restaurant (e.g., titled "Search upcoming events").

In one embodiment, the social networking system learns the context of a selector by monitoring user selections from prior search results performed using the selector. For example, if users used a newly-added selector to search for objects and in the majority of cases resulted in the user selecting an object having a particular type, then that type could be associated with the selector as being the primary type in the selector context.

The context of a selector—whether learned automatically by the social networking system, set manually by a user, or some combination thereof—can be applied in various ways to control the objects that are displayed to users as search results, and to control the manner in which the objects are displayed. For example, in one embodiment, objects without types that match the selector are filtered out of search results produced by that selector. In one embodiment, objects in the search results produced by a selector are ranked based upon whether, or to what degree, the types of the objects match those of the selector context.

BRIEF DESCRIPTION OF DRAWINGS

FIG. 6 illustrates a sample page administrator user interface for a fictional bookstore.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Example User Interfaces

Figure 1A:
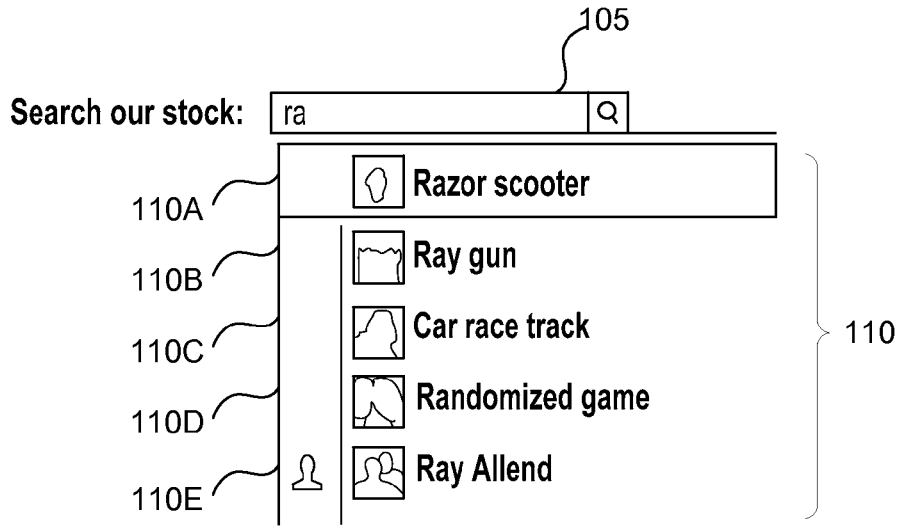
FIGS. 1A and 1B provide examples of the use of selectors in different contexts.
Figure 1B:
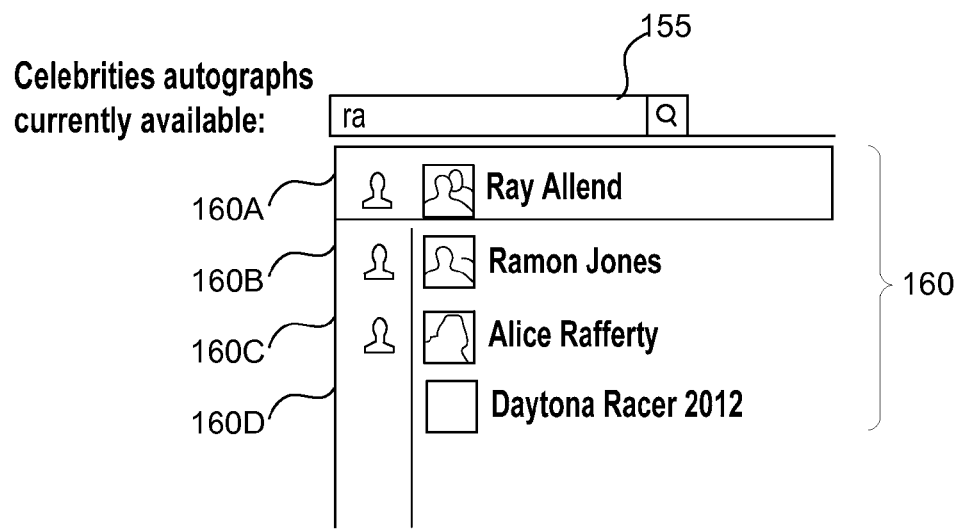

FIGS. 1A and 1B are screen shots providing examples of "selectors," user interface elements of a social networking system that allow users to search for and locate objects of the social networking system that are particularly relevant to the context in which the search takes place. For example, FIG. 1A depicts a portion of a web-based user interface 101 for a toy store. The user interface 101 includes a selector 105, implemented as a text entry area, into which a user has entered the characters "ra", the first two characters of a (presumably longer) query for items within the stock of the toy store. In response to the entry of the characters in the selector 105, the social networking system has provided a corresponding set of search results 110, each item of which matches the entered characters. (Specifically, each of the objects in the search results 110 has a name with a word for which the entered characters are a prefix. For example, the entered characters "ra" are a prefix to the words "Razor," "Ray," "race," "Randomized," and "Ray," in the search results 110.) The use of the selector 105 to retrieve objects of the social networking system allows the toy store web page to quickly provide suggestions to users about what they are searching for, even though the user has only typed a few characters, which is a great user convenience.

Note that the selector 105 exists within the context of a page for a toy store, and more specifically, corresponds to a search of the stock of the toy store. In contrast, the social networking system may include data on an enormous number of distinct objects (e.g., millions or billions) of widely varying types (e.g., people, places, events, or things), not all of which will be relevant to the search. Thus, it would be particularly beneficial to a user to emphasize the objects that are relevant to the search context, rather than merely selecting objects based purely on the characters entered into the selector 105.

Accordingly, the search results 110 of the selector 105 emphasize objects corresponding to products, such as the razor scooters, ray guns, car race tracks, and games corresponding to objects 110A-D. The search results 110 also include a web page for a person—a fictitious celebrity named "Ray Allend"—having a name matching the entered characters, and included due to the celebrity's immense popularity. However, the page is given a lower rank in the search results than the products because it is not of the expected type (i.e., it is a page rather than a product), and hence the inclusion of the page in the search results does not distract the user from what he or she was likely looking for (i.e., products).

FIG. 1B is a screen shot illustrating the use of a selector in a different context. Specifically, FIG. 1B depicts a web-based user interface 151 for a commercial web site selling autographs of celebrities. Thus, whereas users of the toy store of FIG. 1A would tend to search for products (e.g., toys) using the selector 105, users of the autograph website of FIG. 1B would instead tend to search for people (i.e., the celebrities in whose autographs the users are interested). Thus, the objects of interest in FIG. 1B would typically be people, or web pages dedicated to those people.

Accordingly, although the same characters (i.e., "ra") are entered into the selector 155 of FIG. 1B, they produce a different set of search results than in FIG. 1A. Specifically, the results 160 include three web pages dedicated to people having names matching the entered characters (namely, "Ray Allend," "Ramon Jones," and "Alice Rafferty"), followed by a video game with a name matching the entered characters ("Daytona Racer 2012") and included due to its large global popularity.

Now that examples of selectors have been provided, system architectures and techniques for implementing the selectors are discussed below.

System Architecture

Figure 2:
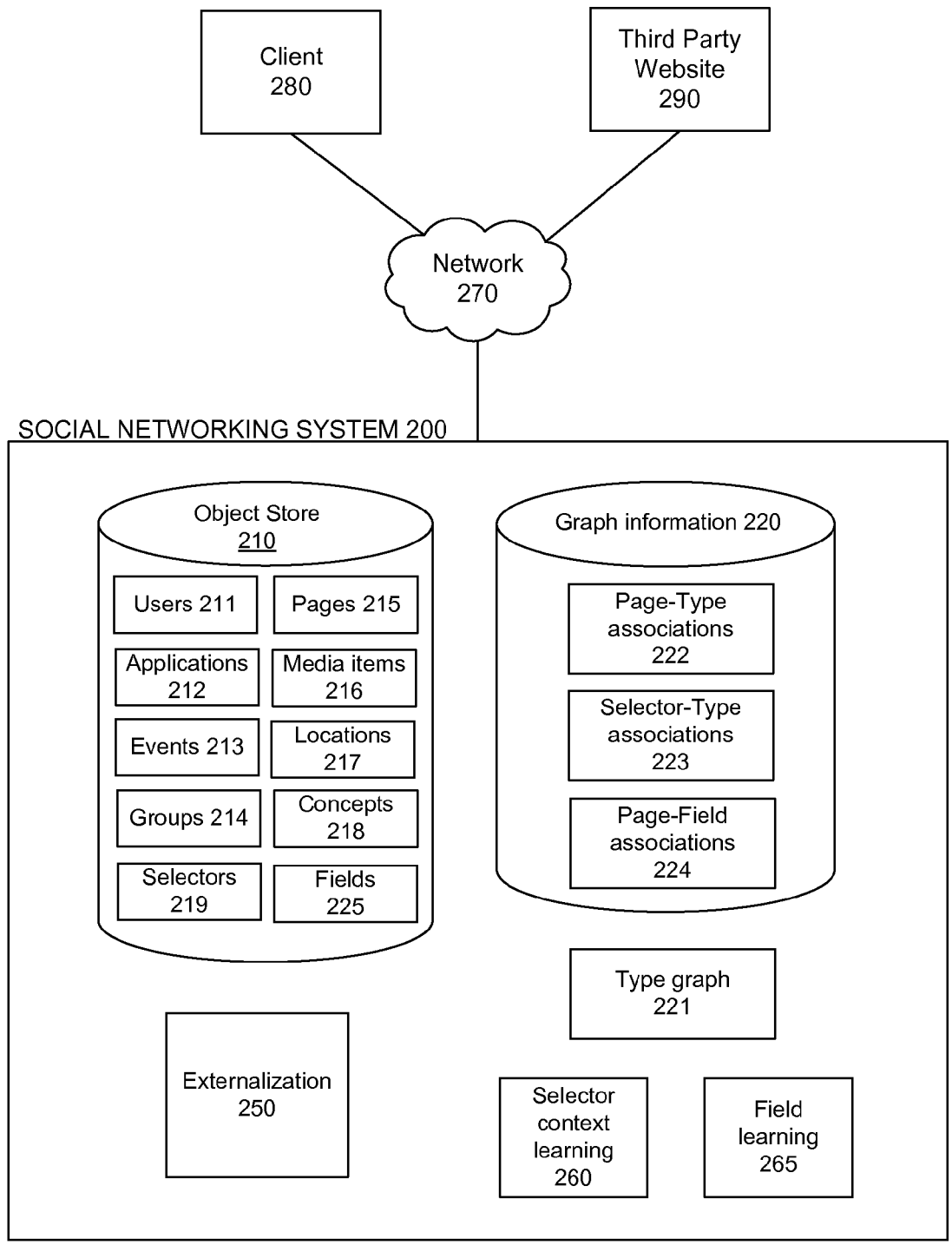
FIG. 2 is a high-level block diagram of a computing environment, according to one embodiment.

FIG. 2 is a high-level block diagram of a computing environment according to one embodiment. FIG. 2 illustrates a social networking system 200, a client device 280, and a third party website 290 connected by a network 270. A user of the client device 280 interacts with the social networking system 200 via an application such as a web browser, performing operations such as browsing content, posting messages, performing queries for people or other content of interest, and the like. The user can also use the client device 280 to interact with the third party website 290. Additionally, the third party website 290 can also interact with the social networking system 200 to obtain or to display data of the social networking system, either directly or indirectly.

The social networking system 200 comprises a number of components used to store information on objects represented in or by the social networking environment, and on the relationships of the objects. The social networking system 200 additionally comprises components to enable clients of the system—such as a human user of the client device 280 interactively using the system, or a component of the third party website 290 requesting information using an externalization module 250 (described further below)—to query the system for information of interest.

More specifically, the social networking system 200 comprises an object store 210 that stores information on various objects tracked by the social networking system 200. These objects may represent a variety of things with which a user may interact in the social networking system 200, including, without limitation, other users 211 of the social networking system (represented, e.g., as a profile object for the user), applications 212 (e.g., a game playable within the social networking system), events 213 (e.g., a concert that users may attend), groups 214 to which users may belong, pages 215 (e.g., pages constituting a particular person or organization's presence on the system, such as pages about the fictitious celebrity "Ray Allend," or pages about different aspects of a restaurant), fields 225 (discrete units of semantically-meaningful information on a page, such as the hours of operation or the telephone number listed on a business page), items of media 216 (e.g., pictures, videos, audio, text, or any other type of media content), locations 217 associated with a user (e.g., "San Jose, Calif., USA"), and concepts 218 or other terms (e.g., an object corresponding to the concept "Victorian literature," or to the product "Razor scooter"). In one embodiment, the object store 210 also stores object selectors 219, which are objects used to query, display, and select other objects in the object store 210, as described further below with respect to FIG. 4. The object store 210 may further store objects representing other data routinely produced by users of the social networking system 200, such as inbox messages, status updates, comments, notes, and postings. An object in the object store 210 may represent an entity existing within the social networking system (e.g., an application 212 available on the social networking system), a virtual entity that exists outside the domain of the social networking system (e.g., a website), or a real-world entity (e.g., a person, a sports team, or a retail store).

The object store 210 may store all of the objects existing within the social networking system 200, such as the code of an application 212, or the image data associated with an image media item 216. Alternatively, for virtual entities existing outside of the social networking system 200, the object store 210 may contain some form of pointer or reference to the entities, such as the uniform resource locator (URL) of an external media item 216. Additionally, the object store 210 may also store metadata associated with the objects, such as a name describing the object (e.g. "Ray Allend" for a person, "Birthday Reminder" for an application, or "Penguin Fanciers" for a group), an image representing the object (e.g., a user profile picture), or one or more tags assigned to the object by users (e.g. the textual strings "game", "crime", and "strategy" for a strategy game application). Different types of objects may have different types of metadata, such as a set of associated users 211 for a group 214, a media type (e.g., "video") for a media item object 216, and a unique user ID and name tokens (e.g., separate first and last names "Ray" and "Allend") for a user object 211.

In one embodiment, the object store 210 associates an object type with each object. The types may be a single atomic type, or they may be compound types describing a hierarchy of related types or sub-types. For example, a user object 211 (for which no further qualifications are needed) might have the type "User," whereas a page object 215 representing a Japanese restaurant might have the type "Page.Business.Restaurant.Japanese," representing that the object is a page, and more specifically, a page representing a business, and yet more specifically a restaurant business, and still more specifically a Japanese restaurant business.

Figure 3:
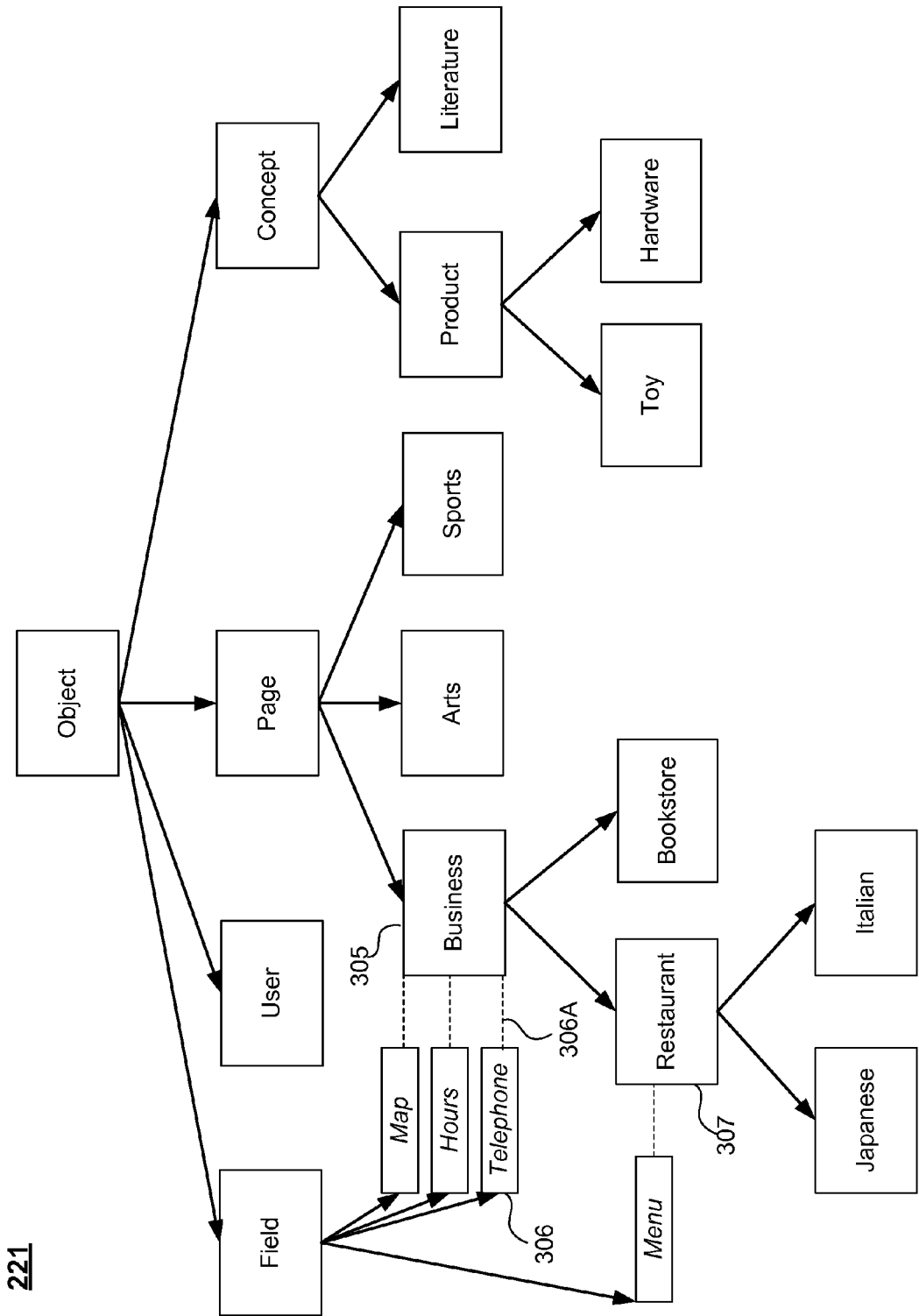
FIG. 3 depicts an example of a hierarchy for categorizing pages and other objects of a social networking system, according to one embodiment.

In one embodiment, the social networking system 200 captures the relationship of various types of objects in a type graph 221 that can be used to categorize pages 215 or other types of objects, fields 225 within individual pages 215, and the like. FIG. 3 depicts one example of such a hierarchy for the type graph 221. In the example, "Object" is the universally-applicable type from which all others derive, and "Page" 302 (the type of page objects 215) and "Concept" 304

(the type of concept objects 218) are two of the types of objects in the object store 210. In turn, "Business" 305, "Arts," and "Sports" are broad top-level types 218, and the type "Business" has sub-types "Restaurant" and "Bookstore" (two examples of commercial entities), and "Restaurant" still further has sub-types "Japanese" and "Italian" (representing different types of cuisine in which restaurants can specialize). Similarly, the "Concept" type in turn has a sub-type "Product" (representing items for sale), and "Product" in turn has its own sub-type "Toy" (representing a particular type of item for sale). Thus, the hierarchy relates different types as generalizations or specializations of other types.

In one embodiment, each type applicable to a page 215 in the type graph 221—e.g., the Page type 302 of FIG. 3, and its various sub-types—can have associated field types 303 that specify properties that the page type has, or may have. In the example of FIG. 3, for instance, the "Business" page type 305 has associated field types "Map," "Hours," and "Telephone" 306, which respectively represent a map of the business location, the times of day that the business is open to customers and the telephone number at which the business can be reached. Further, the "Restaurant" page type 307 has the associated field type "Menu," which represents a set of food items that a given restaurant serves. In one embodiment, the field types 303 themselves are implemented as concepts 304. In one embodiment, "child" types inherit the fields of their "ancestor" types, such as the "Restaurant" page type 307 also having the Map, Hours, and Telephone fields of the "Business" parent type.

In one embodiment, the hierarchy is manually created by the operators of the social networking system 200. In other embodiments, the hierarchy is generated dynamically, either partially or entirely. For example, the discussion of FIG. 6, below, includes a description of the dynamic association of fields 225 with other types in the type graph 221.

It is appreciated that the hierarchy of FIG. 3 is purely for purposes of example, and that in practice a type hierarchy could have any number of types and/or fields, arranged in any manner.

Returning again to FIG. 2, in one embodiment the social networking system 200 further comprises a graph information store 220 that represents the objects of the object store 210 as nodes that are linked together in a "social graph." The graph information store 220 thus comprises information about the relationships between or among the objects, represented as the edges connecting the various object nodes. Various examples of edges in the social graph include: an edge between two user objects 211 representing that the users have a relationship in the social networking system (e.g., are friends, or have communicated, viewed the other's profile, or interacted in some way), an edge between a user object 211 and an application object 212 representing that the user has used the application, and an edge between a user object 211 and a group object 214 representing that the user belongs to the group, and an edge between a user object 211 and a page object 215 representing that the user has viewed the page.

For example, if one user 211 establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. Using a social graph, therefore, a social networking system may keep track of many different types of objects and edges (the interactions and connections among those objects), thereby maintaining an extremely rich store of socially relevant information.

In one embodiment, edges in the graph information store 220 have associated metadata, such as a label describing the type of relationship (e.g., "friend" as the label between two user objects), and/or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

Pages 215 may also be associated with corresponding specific types, such as a page dedicated to a particular restaurant business specializing in Japanese cuisine being associated with the specific type "Object.Page.Business.Restaurant. Japanese," as depicted in FIG. 3. Thus, in one embodiment the graph information store 220 includes a set of page-type associations 222, each association relating a particular page 215 to a corresponding type.

In one embodiment, the page-type associations 222 are specified manually by the creators of the pages. In one such embodiment, at the time of page creation the social networking system 200 provides the creator of a page 215 with the opportunity to specify a concept 218 that the page represents, and the page-type associations 222 are updated accordingly. In one embodiment, the social networking system 200 presents the creator of the page with a series of choices corresponding to type/sub-type relationships embodied by the type graph 221. Referring to the example of FIG. 3, the social networking system 200 might first present a page creator creating a page about a Japanese restaurant with a choice of whether the page is about business, arts, or sports. In response to the answer "business," the social networking system 200 would then present the creator with the choice of whether the page is more specifically about a restaurant or a bookstore, and so forth, until the final type "Japanese" is arrived at. (In one embodiment, the type is represented as the entire "path" of types and sub-types, such as Object→Page→Business→Restaurant→Japanese.)

Selectors 219 may be embedded in any number of different types of pages 215, each page potentially representing a different context. Additionally, different selectors may be embedded within the same page, such as one selector on a restaurant page for selecting food items on the menu, and one for selecting the different songs typically played by the restaurant. To track the different contexts of the different selectors, in one embodiment the graph information 220 additionally comprises selector-type associations 223 that specify associations between particular selectors 219 and a set of one or more corresponding types that acts as a context that influences selector output. For example, referring back to FIG. 1A, the selector 105 might be associated with a context that includes the "Product" type of FIG. 3, or its more specific "Toy" sub-type, given that the purpose of the selector 105 is to select names of objects relevant to toys to be purchased. In contrast, the selector 155 of FIG. 1B might be associated with the "User" or "Page" types of FIG. 3, given that its purpose is to select names of celebrities (e.g., users 211 of the social networking system 200, or pages 215 devoted to the celebrities).

Selector Implementation

The selector-type associations 223 may be determined in different ways in different embodiments. For example, in one embodiment page creators manually specify one or more associated types for each selector 219 that they add to their pages 215, e.g., by answering a series of questions based on the type graph 221. (For example, a type for the selector 215 could be obtained by a series of questions such as "Do your users wish to find other users, pages, fields, or concepts?"; "Does the concept relate to products or literature?"; "Is the product a toy or hardware?")

In many instances, it is appropriate for a page creator to manually specify the type(s) associated with a selector. In other cases, however, the page creator may not wish to take the time to specify the associated types, or the page creator may not know ahead of time which types of objects the selector will typically be used to select. Thus, in another embodiment the social networking system 200 comprises a selector context learning module 260 that learns the selector context—that is, one or more types of particular relevance to a given selector based on previous user selections using the selector. In this embodiment, the page creator may add a particular selector to a page 215 without any manually specified context. As a result, when users use the selector to select objects, the selector initially does not adjust the search results based on the context. However, the selector context learning module 260 monitors the types of the objects selected from the selector result set and determines the types that should be associated with the selector based on counts of the different selected types.

Figure 4:
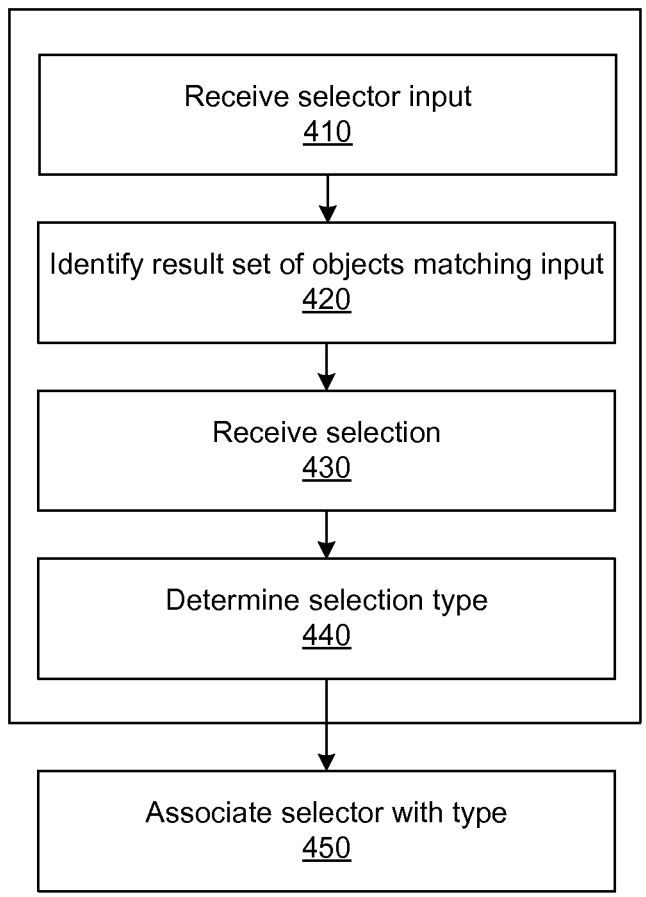
FIG. 4 is a flowchart depicting the operations performed when learning the type(s) associated with a given selector, according to one embodiment.

FIG. 4 is a flowchart depicting the operations that the selector context learning module 260 performs when learning the type(s) associated with a given selector 219, according to one embodiment. Initially, there is no context—that is, no object types—associated with the selector. The selector 219 receives 410 input, such as the typed characters "ra" in FIG. 1A. The selector 219 then identifies 420 a result set consisting of objects matching the received input, such as all objects (or some subset thereof) having a name with at least one word beginning with the typed characters. Alternatively, the object names need not begin with the typed characters, but may have the typed characters anywhere within the object names; e.g., "ra" would also match "Grape" as well as "Ray".

When identifying 420 and/or modifying the result set, the selector 219 may optionally also take into account information in the social networking system 200 about the user providing the query input that can be used to determine an estimated degree of the user for the various objects in the result set. This user information may include connections of the user in the graph information store 220, such as other users 211 with whom the user has a friend relationship either directly or indirectly, media items 216 that the user has viewed, a geographic or graph distance between the user and an object in the result set, and the like. For example, referring back to FIG. 1B, the web page for the person "Ramon Jones" 160B could be omitted from the results 160 if neither the user entering the query nor his connections (e.g., friends) with a relationship degree of 2 or less has ever interacted with the page 160B, expressed an interest in a concept 218 represented by the page, or the like. The user information may also include actions that the user has performed on the social networking system 200, such as voting in polls, specifying data in the user's profile, viewing a particular page, and the like. (In some embodiments, an action of a user 211 with respect to another object in the object store 210 of the social networking system 200 may be represented as a connection in the graph information 220, such as a connection between a user 211 and a page 215 representing that the user viewed the page.)

The objects in the result set can be ranked in any number of ways, e.g., according to factors such as object global popularity across all users, distance from the searching user to the object in the object graph of the graph information store 220, and the like.

The selector 219 then receives 430 a user selection of one of the objects in the result set, and determines 440 the type associated with that selected object (e.g., by examining a type attribute associated with the object).

Operations 410-440 may occur a number of times, until the context learning module 260 has obtained enough data to identify an associated type for the selector. For example, in one embodiment, the selector context learning module 260 identifies, as the primary associated type for a selector, any type for which associated objects are selected using the selector over 50% of the time, and at least 3 times in total; a type is identified as a secondary type if it is selected using the selector over 25% of the time, and at least 2 times in total. Once the context learning module 260 has enough data to identify one or more associated types, it associates the type(s) with the selector 219 via the selector-type associations 223.

In one embodiment, the selector context learning module 260 considers all selections of objects, by any user, thus determining the selector context from aggregate user behavior. In other embodiments, the selector context learning module 260 instead personalizes the selector context for each user by taking into account only the selections of that user for that selector. For example, assume that "Video game" and "Scooter" are both sub-types of a general "Toy" type of FIG. 3. Further assume that a particular selector is associated with type "Toy", and a particular user usually selects toys of type "Video game," specifically, from search results in the selector, but that may not be the case for most users of that selector. In such a case, the selector context learning module 260 might associate the type of that selector to "Video game" for that particular user, but not for all users. Thus, when that particular user enters queries into that selector, they will be biased to display video games—which is presumably the preferred toy of that user—thereby presenting the user with more relevant results.

As a concrete example of the operations of FIG. 4, referring back to FIG. 1A, assume that the selector 105 used to search the toy store's inventory were added to the page without any initial associated context. If the selector 105 receives 410 the characters "ra" due to user keystrokes in the selector text area, the selector would then identify 420 a result set of objects with names containing words beginning with "ra," without regard to the types of the objects. For example, the result 110E corresponding to the person "Ray Allend" might be ranked first due its corresponding popularity, even though it does not correspond to an object of type "Toy," or even of type Product. Similarly, the result set might include an object named "Rat" of type "Animal" and an object named "RATATOUILLE" of type "Movie," even though these objects are not of type "Toy." However, if the first three uses of the selector resulted in the selector 105 receiving 430 selections of objects that were all of type "Toy," the selector context learning module 260 might determine 440 that the selector context includes the type "Toy" and associate 450 "Toy" as the primary context type of the selector. After this, the result sets obtained from that selector would be biased towards type "Toy," e.g., by ranking objects of type "Toy" more highly in the result set, as illustrated in the result set of FIG. 1A. Thus, for example, a subsequent query for the characters "ra" might (as in FIG. 1A) result in the toy objects "Razor scooter," "Ray gun," "Car race track," and "Randomized game" (as well as the non-toy, but globally-popular, page for the person "Ray Allend"), and a query for the characters "ro" might result in the toy objects "Rocket" and "Robot."

In one embodiment, the selector context learning module 260 employs a hybrid approach, assigning an initial context for a selector but changing the context subject to subsequent user selections indicating that the initial assignment was inaccurate. For example, the page creator of the autograph business of FIG. 1B might set the primary type for the selector 155 to "User" (a user of the social networking system 200), whereas the users far more often select objects of type "Page," corresponding to pages 215 dedicated to the celebrities in question (who may or may not be users of the social networking system). In such a case, the selector context learning module 260 would alter the primary associated type from "User" to "Page" after receiving a number of user selections of type "Page" from the selector result sets. As another example, the selector context learning module 260 might set the default context for a page based on the type of the page. For example, the default context for a page of type "Business" could be set to include the type "Product," reflecting that selectors on business pages are typically used to find products. However, for a selector on a business page intended to be used to identify store locations in given cities, the selector context learning module 260 could change the context to instead include the type "Location," based on user selections of Location objects initially displayed towards the bottom of the result set. As another example, the selector context learning module 260 might not completely change the type associated with a selector, but merely refine it to a sub-type, such as changing "Toy" to "Video game", as discussed above.

Figure 5:
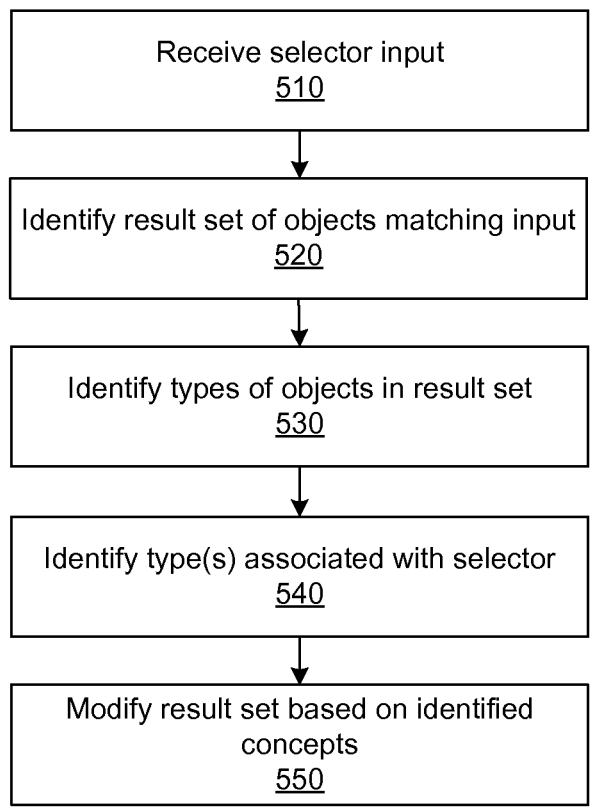
FIG. 5 is a flowchart depicting the operations performed by a selector in response to a search for objects, according to one embodiment.

Once a particular selector 219 has an associated context—e.g., due to the selector context learning module 260 learning the context—the selector can apply that context to display more useful search results to users. FIG. 5 is a flowchart depicting the operations performed by a selector 219 in response to a search for objects, according to one embodiment. The selector 219 receives 510 input and identifies 520 a result set of objects matching that input, as described above with respect to operations 410-420 of FIG. 4. The selector 219 then identifies 530 the types of the objects in the result set, as described above with respect operations 440. The selector 219 also identifies 540 the type or types that make up the context associated with the selector, e.g., as learned by the selector context learning module 260.

A selector 219 can modify 550 the result set based on the selector context in different manners in different embodiments. In one embodiment, a selector 219 filters out—from the result set of objects that match the search characters entered into the selector—any objects having a type that does not match any type within the selector context. (In embodiments such as that of FIG. 3, where the types are arranged hierarchically into super types and subtypes, the type of an object is said to match a type within the selector context if the object type is the same as, or a subtype of, the type within the selector context. For example, the object type "Restaurant" in FIG. 3 would match the selector context type "Business" because "Restaurant" is a subtype of "Business.")

In other embodiments, a selector 219 does not filter out result set objects with types not matching the selector context, but rather adjusts ranking scores of the objects. For example, a selector 219 could penalize an object by some predetermined amount or percentage for lacking a matching type. This causes objects without matching types to tend to be ranked lower in the result set than they would be if selector context were not taken into account. In another embodiment, objects without matching types are assigned to a secondary group of objects, none of which are displayed earlier in the result set than any of the displayed objects with matching types. Thus, for example, the celebrity "Ray Allend" of FIG. 1A, although not of type "Toy," is still shown within the result set, but is displayed after every one of the four objects that are of type "Toy." Either of these approaches allows important objects of other types to continue to be displayed, providing the user with other possible options while still prominently displaying the objects expected to best match the search context. Providing other options allows the context of the selector to be re-learned over time if users begin selecting objects of types different from those typically selected at an earlier date.

The selector 219 can also adjust ranking scores within those types that are part of its context. For example, objects of the result set matching the primary associated type can be ranked more highly than those matching a secondary associated type.

In one embodiment, the ranking scores of the objects are not calculated solely upon whether the object types match a type within the selector context, but rather on how closely the types match. In one embodiment, the closeness of the match is determined by a shortest graph distance between the types in the type graph 221. For example, referring back to FIG. 3, if the context of a particular selector 219 had the type Object.Page.Business.Restaurant.Japanese, and an object in the initial result set (based only on a textual character match) were of type Object.Page.Business.Restaurant.Italian, the closeness would reflect a distance of 2, i.e., the number of transitions to go from one node to the closest common parent and thence to the other node.

Referring again to FIG. 2, in one embodiment the social networking system 200 includes an externalization module 250 that allows third party systems external to the social networking system to query the social networking system for objects of interest, e.g., via a selector 219. Thus, the use of selectors 219 (for example) need not be confined to the social networking system 200 itself; rather, any external web site can create a customized search interface that leverages the data of the social networking system.

For example, in one embodiment the externalization module 250 provides code that a third party can include on the third party's web page, the code causing creation of an iframe that loads a URL in the domain of the social networking system 200. The URL itself can include information (e.g., in key-value pairs) that the social networking system 200 can use to determine what content to render in the iframe. For example, when rendering a selector 219 in an iframe, the URL for the iframe can include a selector identifier that tells the social networking system 200 which particular selector to display, and the social network system can also learn the object type associated with the selector by tracking the object types chosen via the selector having that identifier. Since the iframe is in the domain of the social networking system 200, the social networking system has access to the cookies of the user of the social networking system, e.g., for obtaining information such as username. Thus, the social networking system can optionally access the user's connections from the graph information store 220 and use them to modify the results of queries entered via the selector, as described above. Referring to FIG. 1A, the selector 105 used to search for Toy objects could be implemented as an iframe loading content from the domain of the social networking system 200 and embedded in the web page of an external third party web site focusing on toy sales, for example. In this example, the iframe might be specified by HTML code such as <iframe src="http://www.socialnet.com/objquery/id=1383922"></iframe>, specifying that the selector with ID 1383922 from the social network at www.socialnet.com should be displayed.

The externalization module 250 may be implemented in other ways in other embodiments, such as a web services-based API that explicitly makes calls to the social network system 200 for data matching certain criteria, such as objects with given name prefixes and given object types.

Application: Field Selection and Learning

Pages 215 may have associated fields 225, i.e., discrete portions of data describing aspects of the given page, such as an "hours" field specifying the hours of operation of a business page, or a "menu" field specifying the food served by the restaurant that is the subject of a restaurant page. In one embodiment, each of the various possible fields is represented as an object 225 in the object store 210, rather than merely as a snippet of text or other primitive data type, and is thus referred to hereafter as a field object 225. Each field object 225 has a corresponding field type 303 in the type graph 221, such as the "Map," "Hours," "Telephone," or "Menu" fields depicted in FIG. 3, and can have one or more values representing the data for that field type (e.g., the text "555-555-1234" for the "Telephone" field type).

The social networking system 200 can provide a page administrator user interface that allows an administrator of the different pages 215 for an entity on the social networking system to specify the field objects 225 or other information that should be on each page. Selectors 219 provide an administrator with one way to quickly specify relevant types of field objects 225 to be added to a page.

Figure 6:
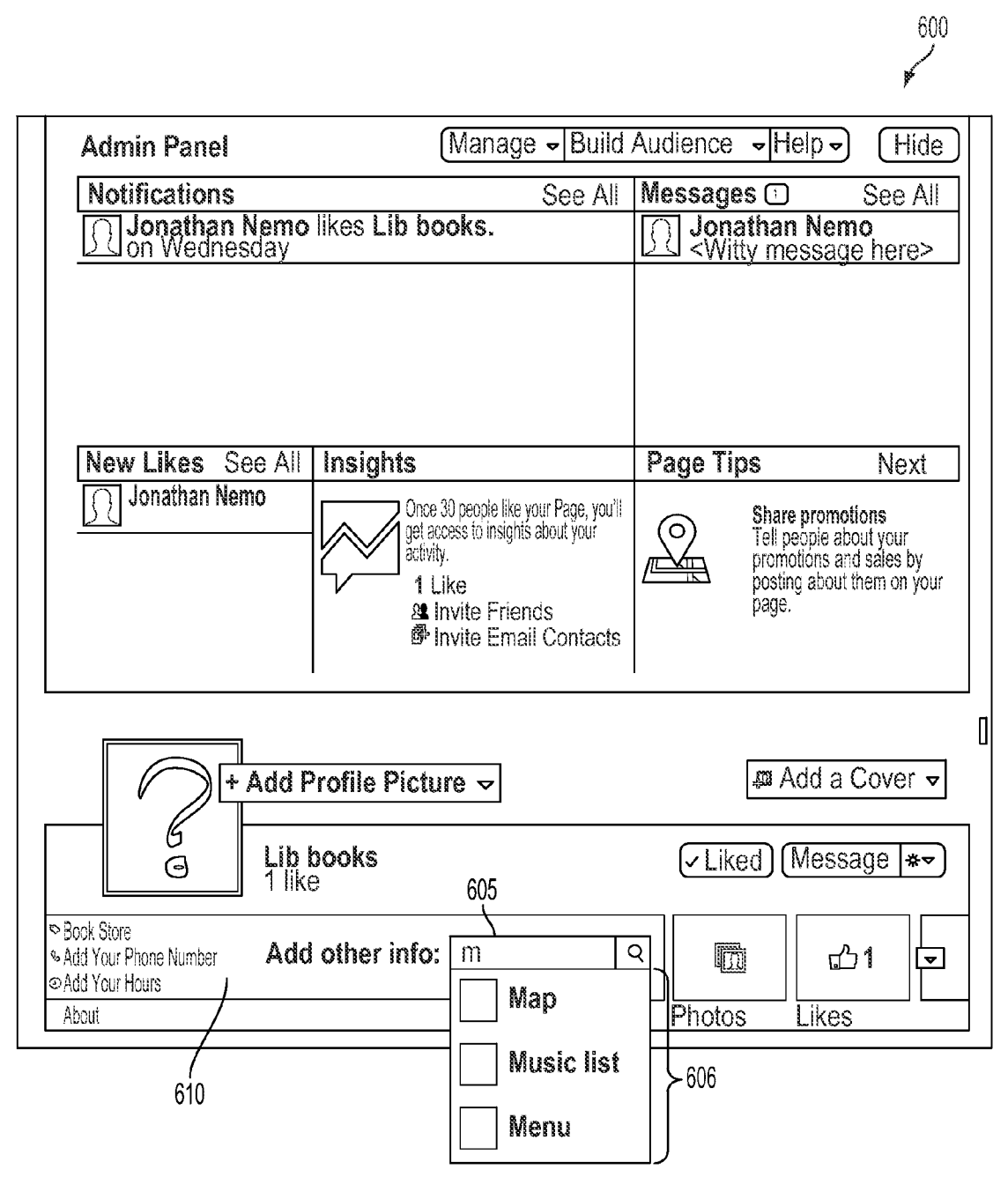

For example, FIG. 6 illustrates a sample page administrator user interface 600 for a fictional bookstore, "Lib books." A user has typed the character 'm' into a selector 605 with a context having a primary (or only) associated type of "field." Accordingly, the selector 605 has displayed a result set 606 of Field objects 303 stored in the type graph 221 that match the entered character 'm' (namely, a "Maps" field for providing the user with a map to a location, a "Music list" field for listing music genres, and a "Menu" field for listing types of food), filtering out (or assigning a low rank to) objects other than field types 303. The administrator can then select applicable types of field objects 225 to add (e.g., a Maps field) to the administrator's pages on the social networking system 200.

In one embodiment, the social networking system 200 additionally comprises a field learning module 265 that identifies the field types 303 selected by administrators for their pages 215 (e.g., via selectors 119) and forms associations between those field types and pages. Specifically, the social networking system 200 comprises a set of Page-Field associations 224 in the graph information store 220, each such association relating a particular page type 302 (e.g., a page of the Business type 305) to a particular field type 303 having at least some threshold degree of association with that page type and hence considered to be appropriate for that page type. In one embodiment, the field learning module 265 notes every time that an administrator adds a particular field type 303 to a page of a type not already associated with that field type in the Page-Field associations 224. Then, after the field type has been added to that page type a sufficient number of times (e.g., a minimum number, or a minimum percentage of the total pages of that type) to establish a threshold degree of association, the field learning module 265 associates that field type 303 with that page type 302 in the Page-Field associations 244.

For example, assume that when the Business page type 305 is first created it has no association with the Telephone field type 306 representing a telephone number of the business. However, after a number of administrators have added the Telephone field type 306 to pages of type Business (or to its subtypes, such as Restaurant), the field learning module 265 creates the association 306A between the Business page type 305 and the Telephone field type 306.

The social networking system 200 can then apply the Page-Field associations 224 to provide more useful options to administrators, including initiating an addition of a field of an appropriate field type to a page not already having a field of that field type. In one embodiment, the selectors 219 with the field type 303 in their contexts can adjust the rankings of the results based upon which field types are associated with the page type in which the selectors are embedded. Specifically, the field types 303 that are associated with the type of the page to which the selector 219 corresponds can have their rankings increased, and the field types that are not associated with that page type can have their ranking decreased. For example, the Map field type in the search result 606 of FIG. 6 could be ranked more highly than the Music list field type or the Menu field type because Map is a known field type of the Business page type 305 of FIG. 3, and the other two fields are not.

In one embodiment, the social networking system 200 can proactively suggest to an administrator of a page that the administrator add particular fields that the Page-Field associations 224 list as being associated with pages of the given page type. For example, in FIG. 6, the user interface 600 provides links 610 suggesting that the administrator add a phone number field and/or business hours field to the pages for the "Lib books" business, since "Telephone" and "Hours" are field types known to be associated with pages of the Business type, as illustrated in the sample of FIG. 3.

Alternatively, the social networking system 200 can automatically add such fields, without requiring user permission. In one embodiment, an instance of a field type is automatically added to a page where the association between the field type and the type of the page has at least some threshold degree of strength greater than that required to create an association between a page type and a field type in the Page-Field associations 224. For example, in one embodiment the threshold degree of strength comprises some minimum number of pages of that page type (e.g., 1000) having an instance of that field, and some minimum percentage of pages of that page type (e.g., 90%) having an instance of that field. When a field instance (e.g., a telephone number field) is automatically added to a page, the social networking system 200 may then request the page administrator to specify a value for the instance (e.g., a valid telephone number).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing, to a client device, a graphical user interface including a selector, the selector associated with an object type based on object types of objects from a plurality of prior user selections within result sets of the selector;
    receiving a query that was entered into the selector on the client device by a user of a social networking system, the object type associated with the selector before the query is received;
    forming a result set by identifying objects matching the query, one or more of the objects of the result set associated with an object type, wherein the object type associated with the selector and the object types of the objects matching the query are nodes of a hierarchical type graph, and wherein an object type of an object matches the object type of the selector if the object type is the same as the object type of the selector or is a subtype of the object type of the selector;
    determining distances in the type graph between the object type associated with the selector and the object types of the objects matching the query;
    ranking the objects in the result set based at least in part on:
        whether the object types associated with the objects in the result set are the same as the object type of the selector or are subtypes of the object type of the selector, and
        the determined distances in the type graph; and
    providing one or more objects of the result set to the client device for display in visual association with the selector in the graphical user interface.

2. The computer-implemented method of claim 1, further comprising:
    receiving a plurality of selections of objects from a plurality of users using the selector;
    determining one or more types associated with the selected objects; and
    determining that the object type is associated with the selector based on the determined types associated with the selected objects.

3. The computer-implemented method of claim 2, wherein determining a type associated with the selector comprises:
    identifying a type most frequently associated with the selected objects; and
    adding the most frequent type as the object type associated with the selector.

4. The computer-implemented method of claim 1, further comprising removing, from the result set, objects with types not matching the object type of the selector.

5. The computer-implemented method of claim 1, further comprising ranking a first one of the objects matching the query more highly than a second one of the objects matching the query, responsive to the first one of the objects having an object type matching the object type associated with the selector and the second one of the objects not having an object type matching the object type of the selector.

6. The computer-implemented method of claim 1, wherein the user interface is for a page, and the user interface includes a plurality of selectors, at least two selectors of the plurality of selectors associated with different object types.

7. The computer-implemented method of claim 1, further comprising receiving a selection of one of the objects of the result set from the user.

8. The computer-implemented method of claim 1, further comprising modifying the result set based at least in part on a connection between the user and another user.

9. The computer-implemented method of claim 1, further comprising modifying the result set based at least in part on a connection between the user and a page on the social networking system.

10. The computer-implemented method of claim 1, further comprising modifying the result set based at least in part on a connection between the user and a media item on the social networking system.

11. The computer-implemented method of claim 1, further comprising modifying the result set based at least in part on a connection between the user and an application hosted on the social networking system.

12. The computer-implemented method of claim 1, further comprising modifying the result set based at least in part on a connection between the user and a group defined by the social networking system.

13. The computer-implemented method of claim 1, wherein the user interface that includes the selector is a web page of a third party site external to the social networking system.

14. A non-transitory computer-readable storage medium storing executable computer program instructions comprising:
   instructions for providing, to a client device, a graphical user interface including a selector, the selector associated with an object type based on object types of objects from a plurality of prior user selections within result sets of the selector;
   instructions for receiving a query that was entered into the selector on the client device, the object type associated with the selector before the query is received;
   instructions for forming a result set by identifying objects matching the query, one or more of the objects of the result set associated with an object type, wherein the object type associated with the selector and the object types of the objects matching the query are nodes of a hierarchical type graph, and wherein an object type of an object matches the object type of the selector if the object type is the same as the object type of the selector or is a subtype of the object type of the selector;
   instructions for determining distances in the type graph between the object type associated with the selector and the object types of the objects matching the query;
   instructions for ranking the objects in the result set based at least in part on:
      whether the object types associated with the objects in the result set are the same as the object type of the selector or are subtypes of the object type of the selector, and
      the determined distances in the type graph; and
   instructions for providing one or more objects of the result set to the client device for display in visual association with the selector in the graphical user interface.

15. The non-transitory computer-readable storage medium of claim 14, further comprising:
   instructions for receiving a plurality of selections of objects from a plurality of users using the selector;
   instructions for determining one or more types associated with the selected objects; and
   instructions for determining a type associated with the selector based on the types associated with the selected objects.

16. The non-transitory computer-readable storage medium of claim 15, wherein determining a type associated with the selector comprises:
   identifying a type most frequently associated with the selected objects; and
   adding the most frequent type as the object type associated with the selector.

17. The non-transitory computer-readable storage medium of claim 14, wherein the user interface is for a page, and the user interface includes a plurality of selectors, at least two selectors of the plurality of selectors associated with different object types.

18. A computer-implemented method comprising:
   providing, to a client device, a graphical user interface including a selector, the selector being a graphical component of the graphical user interface and being associated with an object type based on object types of objects from a plurality of prior selections made by a plurality of different users within result sets of the selector;
   receiving a query that was entered into the selector on the client device by a user of a social networking system, the object type having been associated with the selector before the query was received;
   forming a result set by identifying objects matching the query, one or more of the objects of the result set being associated with an object type, wherein the object type associated with the selector and the object types of the objects matching the query are nodes of a hierarchical type graph, and wherein an object type of an object matches the object type of the selector if the object type is the same as the object type of the selector or is a subtype of the object type of the selector;
   determining distances in the type graph between the object type associated with the selector and the object types of the objects matching the query;
   ranking the objects in the result set based at least in part on:
      whether the object types associated with the objects in the result set are the same as the object type of the selector or are subtypes of the object type of the selector, and
      the determined distances in the type graph; and
   providing a plurality of the objects of the result set to the client device for display in visual association with the selector in the graphical user interface, wherein the provided plurality of objects comprise at least two different object types.

* * * * *